United States Patent
Park et al.

(10) Patent No.: US 9,720,170 B2
(45) Date of Patent: Aug. 1, 2017

(54) ARRAYED WAVEGUIDE GRATING DEVICE AND METHOD FOR MANUFACTURING THE SAME

(71) Applicant: ELECTRONICS AND TELECOMMUNICATIONS RESEARCH INSTITUTE, Daejeon-si (KR)

(72) Inventors: Heuk Park, Daejeon-si (KR); Sang Soo Lee, Daejeon-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/081,289

(22) Filed: Mar. 25, 2016

(65) Prior Publication Data

US 2016/0282556 A1    Sep. 29, 2016

(30) Foreign Application Priority Data

Mar. 27, 2015    (KR) ........................ 10-2015-0043510

(51) Int. Cl.
*G02B 6/12*    (2006.01)
*G02B 6/26*    (2006.01)
(Continued)

(52) U.S. Cl.
CPC ...... *G02B 6/12033* (2013.01); *G02B 6/12011* (2013.01); *G02B 6/12007* (2013.01); *G02B 6/12009* (2013.01)

(58) Field of Classification Search
CPC ............ G02B 6/12007; G02B 6/12019; G02B 6/12011; G02B 6/12009; G02B 6/12023; G02B 6/12033
(Continued)

(56) References Cited

U.S. PATENT DOCUMENTS 6,898,345 B2 * 5/2005 Okamoto ........... G02B 6/12007
385/24
7,400,800 B2 7/2008 Kitoh et al.
(Continued)

FOREIGN PATENT DOCUMENTS

KR    20050097923 A    10/2005

OTHER PUBLICATIONS

Wim Bogaerts, et al; "Compact Wavelength-Selective Functions in Silicon-on-Insulator Photonic Wires", IEEE Journal of Selected Topics in Quantum Electronics, vol. 12, No. 6, Nov./Dec. 2006, pp. 1394-1401.
(Continued)

*Primary Examiner* — Kaveh C Kianni
*Assistant Examiner* — Hung Lam
(74) *Attorney, Agent, or Firm* — Ladas & Parry LLP

(57) ABSTRACT

An arrayed waveguide grating device and a method for manufacturing the arrayed waveguide grating device. The arrayed waveguide grating device includes input channel waveguides formed on a substrate; output channel waveguides formed on the substrate that correspond to the input channel waveguides; and arrayed waveguides with different lengths interposed between the input channel waveguides and the output channel waveguides on the substrate while free propagation regions being formed at both ends of the arrayed waveguides, wherein the arrayed waveguides are designed so that a free spectral range (FSR) of a higher-order mode is twice or greater than a bandwidth of a region of interest (ROI).

15 Claims, 8 Drawing Sheets

(51) Int. Cl.
*G02B 6/30* (2006.01)
*G02B 6/36* (2006.01)
*G02B 6/10* (2006.01)

(58) Field of Classification Search
USPC ...... 385/14, 15, 24, 37, 39, 45, 46, 49, 126, 385/129–131
See application file for complete search history.

(56) References Cited

U.S. PATENT DOCUMENTS

| | | | |
|---|---|---|---|
| 7,848,602 B2 | 12/2010 | Kim et al. | |
| 2006/0222296 A1* | 10/2006 | Suzuki | G02B 6/12007 385/39 |
| 2008/0166095 A1* | 7/2008 | Popovic | B82Y 20/00 385/126 |

OTHER PUBLICATIONS

Masaki Kohtoku, et al; "Control of Higher Order Leaky Modes in Deep-Ridge Waveguides and Application to Low-Crosstalk Arrayed Waveguide Gratings", Journal of Lightwave Technology, vol. 22, No. 2, Feb. 2004, pp. 499-508.

Jing Wang, et al; "Low-loss and low-crosstalk 8 X 8 solicon nanowire AWG routers fabricated with CMOS technology", Optics Express; vol. 22, No. 8, Published Apr. 10, 2014; pp. 9395-9403.

* cited by examiner

ARRAYED WAVEGUIDE GRATING DEVICE AND METHOD FOR MANUFACTURING THE SAME

CROSS-REFERENCE TO RELATED APPLICATION(S)

This application claims priority from Korean Patent Application No. 10-2015-0043510, filed on Mar. 27, 2015, in the Korean Intellectual Property Office, the disclosure of which is incorporated herein by reference in its entirety.

BACKGROUND

1. Field

The following description relates to an optical device, and more particularly, to an arrayed waveguide grating (AWG) device which is used as wavelength multiplexer/demultiplexer for optical signals in an optical communication system.

2. Description of Related Art

Arrayed waveguide grating (AWG) is a device used as wavelength multiplexer/demultiplexer for an optical signal in an optical communication system. AWG consists of a number of arrayed waveguides that are designed to increase in length from the shortest waveguide to the longest waveguide, so that for light traveling with a constant phase difference between the waveguides, constructive interference takes place on a particular output channel and destructive interference takes place on the other output channels, thereby resulting in the light being divided by wavelength.

If a phase of each of the arrayed waveguides has a different value from a designed phase, sufficient destructive interference may not be produced on the relevant channel, which leads to leakage of signal to other channels. Crosstalk due to the signal leakage is one of important factors that hamper the AWG performance.

A number of methods to improve the crosstalk performance have been suggested, for which one method increases process resolution, which takes a considerable amount of time and cost, while another method increases the width of arrayed waveguides or reduces an etching depth, but inevitably results in a higher-order mode when using a wide waveguide, whereby undesired peaks appear in a spectrum. Also, even when the etching depth is lowered, it is not easy to narrow the width of waveguides to the extent so that a single mode condition can be satisfied to achieve a desired performance. Generally, as a method for suppressing such higher-order modes, it has been known to insert a kind of mode filter that satisfies the single mode condition in the middle of the waveguide. Such a mode filter, however, uses a narrow waveguide and a taper, which may cause poor crosstalk performance and hence may be avoided to use. Also, in some cases, a layout in which the narrow waveguide is identically inserted all over the arrayed waveguide region may not be feasible.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

The following description relates to an arrayed waveguide grating (AWG) device that does not have performance degradation due to a higher-order mode while allowing the higher-order mode in arrayed waveguides, and a method for manufacturing the AWG device.

The following description also relates to an AWG device which can adjust a location of a peak of a higher-order mode without inserting an additional device for suppressing the higher-order mode, and a method for manufacturing the AWG device.

The following description also relates to an AWG device that can be used as a complementary device for improving the performance of a higher-order mode suppression device, and a method for manufacturing the AWG device.

In one general aspect, there is provided an arrayed waveguide grating device including: input channel waveguides formed on a substrate; output channel waveguides formed on the substrate that correspond to the input channel waveguides; and arrayed waveguides with different lengths interposed between the input channel waveguides and the output channel waveguides on the substrate while free propagation regions being formed at both ends of the arrayed waveguides. The arrayed waveguides may be designed so that a free spectral range (FSR) of a higher-order mode is twice or greater than a bandwidth of a region of interest (ROI).

In another general aspect, there is provided a method for manufacturing an arrayed waveguide grating, including: forming input channel waveguides on a substrate; forming output channel waveguides on the substrate that correspond to the input channel waveguides; and forming arrayed waveguides with different lengths interposed between the input channel waveguides and the output channel waveguides on the substrate while forming free propagation regions at both ends of the arrayed waveguides; wherein the arrayed waveguides are designed so that a free spectral range (FSR) of a higher-order mode is twice or greater than a bandwidth of a region of interest (ROI).

Other features and aspects will be apparent from the following detailed description, the drawings, and the claims.

Figure 1:
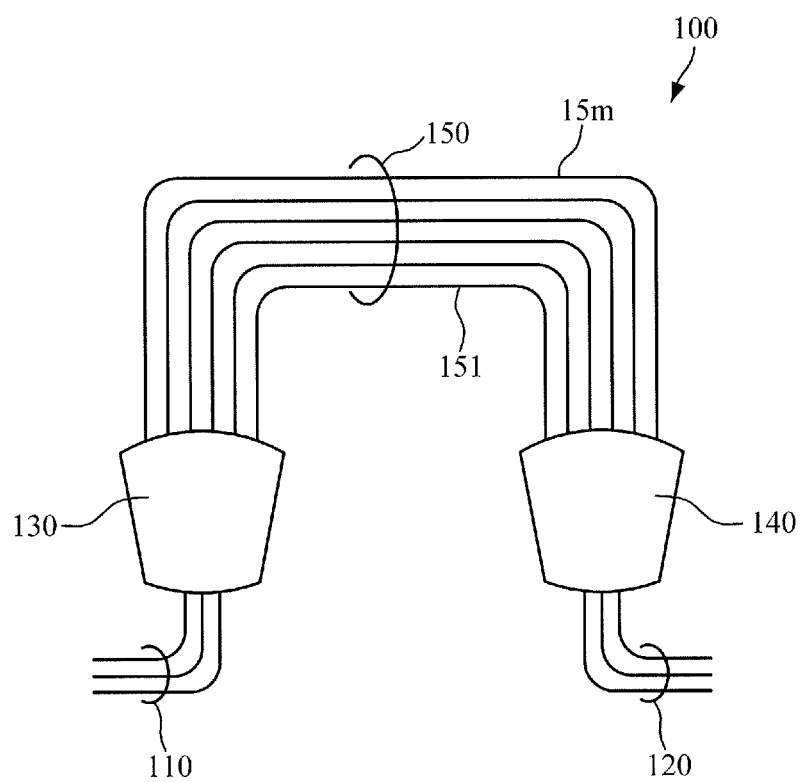
FIG. 1 is a diagram illustrating a configuration of an arrayed waveguide grating (AWG) according to an exemplary embodiment.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

FIG. 1 is a diagram illustrating a configuration of an arrayed waveguide grating (AWG) according to an exemplary embodiment.

Referring to FIG. 1, an AWG 100 is an optical device that is implemented on a substrate, such as a silicon wafer. The AWG 100 includes input channel waveguides 110 formed on the substrate, output channel waveguides 120 formed on the substrate that correspond to the input channel waveguides 110, arrayed waveguides 150 with different lengths interposed between the input channel waveguides 110 and the output channel waveguides 120 on the substrate while free propagation regions FPR 130 and 140 being formed at both ends of the arrayed waveguides 150.

The input channel waveguides 110 have waveguides that form one or more channels, and an optical signal is input through each waveguide. The optical signal output from the input channel waveguide 110 is diffracted in the free propagation region 130 on the input side and the diffracted signal enters into the arrayed waveguide 150.

The arrayed waveguides 150 consist of a plurality of waveguides 151, . . . and 15M with constant length difference to produce phase differences among the optical signals input from the input channel waveguides 110. Optical interference depends on the length of optical path, a refractive index of medium, or wavelength or frequency of the light. The use of the arrayed waveguides 150 with constant length difference may vary the length of optical path. The arrayed waveguides 150 with constant length difference convert an optical signal input from a particular input channel waveguide 110 into a plurality of optical signals with constant phase difference. If M number of arrayed waveguides 150 are arranged with constant length difference ΔL and an optical signal of the same wavelength λ is input to each of the arrayed waveguides, M number of optical signals output from the respective arrayed waveguides have the same wavelength λ, but with a constant phase difference n*ΔL/λ (n represents an effective refractive index of the arrayed waveguides) among them due to delay propagation.

The optical signals output from the respective arrayed waveguides 150 freely propagate in the free propagation region 140 on the output side.

The optical signals from the arrayed waveguides 150 are coupled and output to the output channel waveguides 120. In this case, the output channel waveguides 120 output multiple optical signals with different wavelengths, due to the maximum constructive interference and destructive interference among the optical signals from the arrayed waveguides 150. For example, M number of optical signals output from M number of arrayed waveguides 150 interfere with each other at the entrance of the output channel waveguides 120. If phases of the M optical signals differ by an integral multiple of 2π, an image is formed on the output waveguides.

Figure 2:
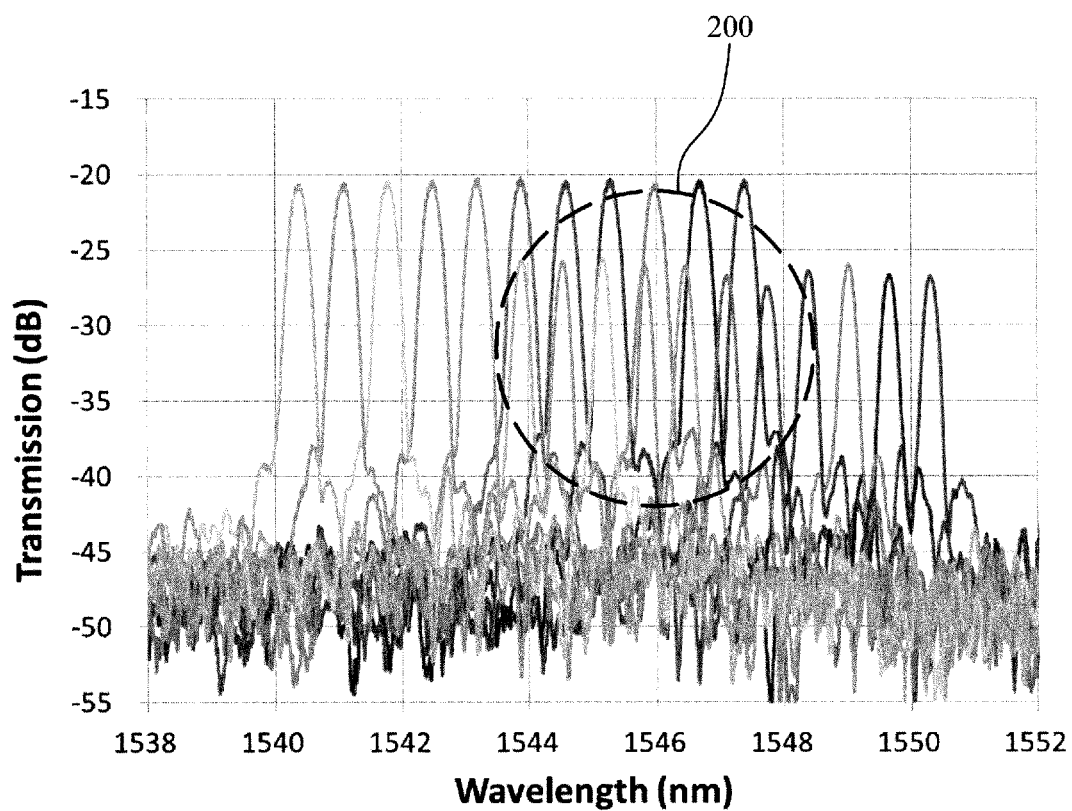
FIG. 2 is a graph showing a spectrum of an AWG using higher-order mode waveguides as arrayed waveguides.

FIG. 2 is a graph showing a spectrum of an AWG using higher-order mode waveguides as arrayed waveguides.

Referring to FIG. 2, because a higher-order mode of an arrayed waveguide region has a different effective refractive index from that of a fundamental mode, the transmission band of the higher-order mode is placed at a different location from the fundamental mode. The transmission band of the higher-order mode partially overlaps (as depicted by 200) the transmission band of the fundamental mode, which may cause performance degradation.

The exemplary embodiments of the present disclosure provide an AWG device which has transmission bands that are separate corresponding to the fundamental mode and the higher-order mode, and thus have no impact on the performance of the AWG device. That is, in order to separate components, produced due to the higher-order mode of the arrayed waveguides 150, from leak signals that may occur in the AWG, a free spectral range (FSR) is designed to be twice or greater than a bandwidth B of a region of interest. Here, The AWG 100 shows a characteristic in which a transmission spectrum increases in intensity at regular intervals with respect to a pair of input and output channels. This characteristic is called a cyclic characteristic. The regular interval is called an FSR.

In order to design the AWG device so that a component produced due to a higher-order mode of the arrayed waveguides 150 can be separated from signals, a condition must be met—the condition that the FSR of the higher-order mode is twice or greater than the bandwidth B of the region of interest—which is further explained below.

In an AWG spectrum, a location of peak $\lambda_k^l$ with diffraction order m+k that is caused by the lth order mode of a waveguide is expressed as Equation 1 below.

$$\frac{n^l(\lambda_k^l)}{\lambda_k^l} - \frac{n^l(\lambda_0^l)}{\lambda_0^l} = \frac{k}{\Delta L} = \frac{kn_0}{m\lambda_0}, \qquad (1)$$

where m denotes a diffraction order of an AWG center wavelength, ΔL is a difference in length between two neighboring waveguides of the AWG arrayed waveguides, and $n^l(\lambda)$ denotes a refractive index of lth order mode of a waveguide. Also, $\lambda_o$ is the center wavelength of the AWG, that is, $\lambda_o^0$ which is a wavelength of the fundamental mode with diffraction order of m. $n_o$ is $n_0(\lambda_0)$. m may be expressed as Equation 2 below.

$$m = \frac{n_0}{n_g^0(\lambda_0)} \frac{v_0}{v_{FSR}}, \qquad (2)$$

where $v_o$ is $C/\lambda_o$, and $v_{FSR}$ denotes a FSR in frequency domain. $n_g^l(\lambda)$ denotes a group index of a wavelength λ. $n_g^l(\lambda_0)$ denotes a group index of the fundamental mode at $\lambda_o$. Typically, m is set as an integer.

Given that $\lambda_k^l = \lambda_0^l + \Delta\lambda_k$ in Equation 1 and Taylor expansion to the first order of $\Delta\lambda_k$ is performed with respect to $\lambda_o^l$, it is obtained that $\Delta\lambda_k[-n_l^g(\lambda_l^0/(\lambda_o^l)^2)]=kn_0/m\lambda_0$ and hence $\Delta\lambda_k$ can be expressed as Equation 3 below.

$$\Delta\lambda_k = -\frac{k(\lambda_0^l)^2 n_0}{n_g^l(\lambda_0^l) m \lambda_0} \qquad (3)$$

With respect to k=+1, −1 peaks, Equation 3 shows an expression for FSR. $\lambda_k^l$ may be derived from Equation 3, as shown in Equation 4 below.

$$\lambda_k^l = \lambda_0^l + \Delta\lambda_k = \lambda_0^l - k\frac{(\lambda_0^l)^2 n_0}{n_g^l(\lambda_0^l)m\lambda_0} \quad (4)$$

Given that $\Delta\lambda^l = \lambda_0^l - \lambda_0^i$, Equation 5 can be derived from $n^l(\lambda_0^l)/\lambda_0^l = n_0/\lambda_0$, as below.

$$n^l(\lambda_0^l)/\lambda_0^l - n^l(\lambda_0)/\lambda_0 = n_0/\lambda_0 - n^l(\lambda_0)/\lambda_0 = -\Delta n^l/\lambda_0 \quad (5)$$

In equation 5, $\Delta\lambda^l = \lambda_0^l - \lambda_0^i$. If Taylor expansion to the first order term of $\Delta\lambda^l$ in the left hand side of Equation 5 is performed, Equation 6 is derived from $-\Delta^l(n_g^l(\lambda_0)/(\lambda_0)^2) = -\Delta n^l/\lambda_0$ as follows:

$$\Delta\lambda^l = \lambda_0^l - \lambda_0 = \frac{\Delta n^l}{n_g^l(\lambda_0)}\lambda_0 \quad (6)$$

Equation 7 is derived from Equation 4 and Equation 6.

$$\lambda_k^l - \lambda_0 = \frac{\Delta n^l}{n_g^l(\lambda_0)}\lambda_0 - k\frac{(\lambda_0^l)^2 n_0}{n_g^l(\lambda_0^l)m\lambda_0} \quad (7)$$

When k=0 in Equation 7, $\lambda_o^l$ can be expressed as Equation 8 below.

$$\lambda_0^l = \lambda_0\left(1 + \frac{\Delta n^l}{n_g^l(\lambda_0)}\right) \quad (8)$$

When $n_g^l$ is taken as a constant without considering changes in $n_g^l$ due to waveguide width variations or changes in a waveguide, a value of k when $\lambda_k^l = \lambda_0$, i.e., $k_o$ may be derived from Equation 7, as shown in Equation 9 below.

$$k_0 = m\frac{\Delta n^l}{n_0}\left(\frac{\lambda_0}{\lambda_0^l}\right)^2 \quad (9)$$

$k_o$ is usually not an integer, but the peak occurs when a value of k is an integer. Hence, given that the largest integer that is smaller than $k_o$ is N, the higher-mode peaks around $\lambda_o$ are $\lambda_N^l$ and $\lambda_{N+1}^l$. In Equation 7, the greater the value of k, the smaller $\lambda_k^l$, and thus $\lambda_N^l$ is greater than $\lambda_{N+1}^l$.

Figure 3:
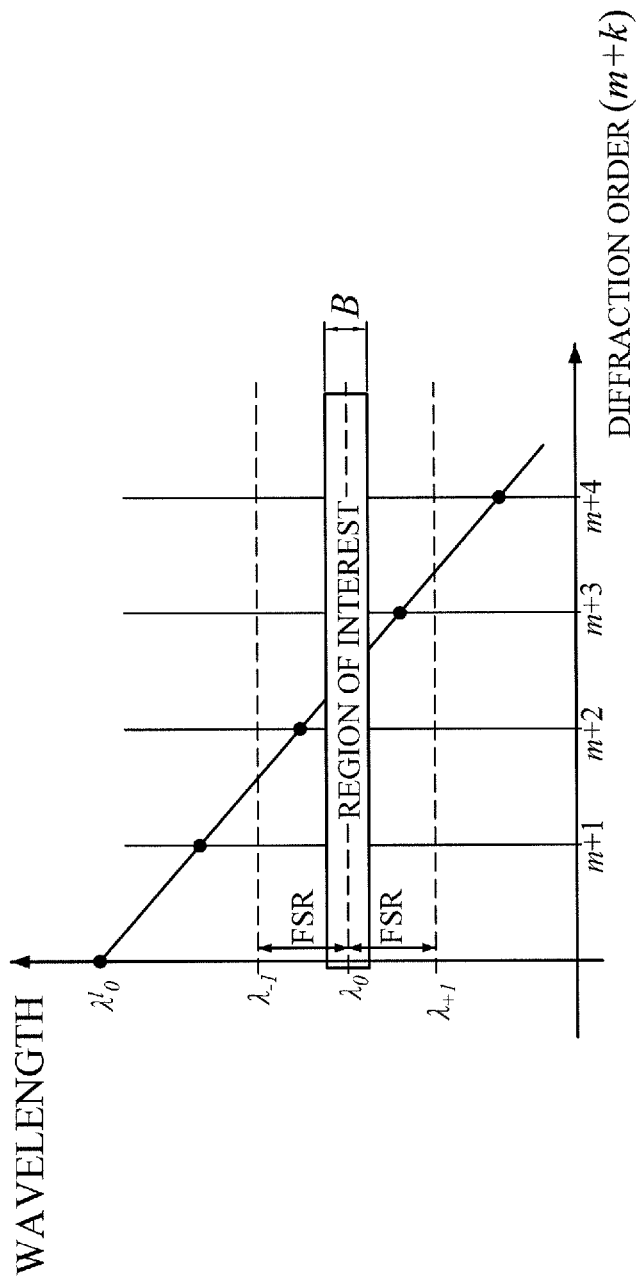
FIG. 3 is a graph for showing a higher-order mode peak condition.

FIG. 3 is a graph for showing a higher-order mode peak condition.

Referring to FIG. 3, a region of interest (ROI) may be an operating wavelength region, which is a bandwidth used by a system. When the bandwidth of the ROI is B and the ROI is symmetric with respect to $\lambda_o$, a bandwidth that is occupied by the sum of outputs from each port of the AWG is B. Because the effective refractive index of a higher-order mode is not significantly different from that of the fundamental mode, the higher-order mode also occupies as much bandwidth as B. The two bandwidths should not overlap each other, and hence the difference in bandwidth between the fundamental mode and the higher-order mode needs to be at least B or greater.

Therefore, $\lambda_N^l$ must satisfy Equation 10 below.

$$\lambda_N^l \geq \lambda_0 + B \quad (10)$$

Also, $\lambda_{N+1}^l$ must satisfy Equation 11 below.

$$\lambda_{N+1}^l \leq \lambda_0 - B \quad (11)$$

Equation 12 can be derived from Equation 10 and Equation 11.

As such, the FSR of a higher-order mode must be at least twice or greater than the bandwidth B of the ROI. Generally, the refractive index of a fundamental mode is greater than that of the higher-order mode, the FSR of the fundamental mode must be greater than the FSR of the higher-order mode.

For example, in the case of an AWG for time and wavelength division multiplexed passive optical network (TWDM-PON) that is formed by using 500 nm silicon-on-insulator (SOI) with 290 nm slab, the AWG used for downlink of a TWDM-PON system uses 8 channels spaced at intervals of 100 GHz from the center wavelength of about 1.58 μm. Therefore, B is 6.4 nm. However, in an actual implementation of the system, a sidelobe of the peak is present, and hence the bandwidth B of the ROI needs to be set to include a guard by taking the sidelobe of the peak into account, according to the exemplary embodiment of the present disclosure. Accordingly, the bandwidth B is set to 10 nm, and the FSR is designed to become at least equal to or greater than 20 nm. The setting of the bandwidth B by taking into account the guard may vary according to specifications and implementation techniques of the system.

According to the exemplary embodiment, in a design space with a waveguide width and an FSR as variables that is created by using a difference in an effective refractive index between the higher-order mode and the fundamental mode depending on the waveguide width, the arrayed waveguides 150 are designed so that the waveguide width falls within an allowed region in which the FRS is twice or greater than the bandwidth of the ROI. Here, the design space may have the waveguide width and the FSR as variables by applying the difference $\Delta n^l$ in an effective refractive index according to the waveguide widths to Equation 9 above. The design space will be described with reference to FIGS. 4 to 7.

Figure 4:
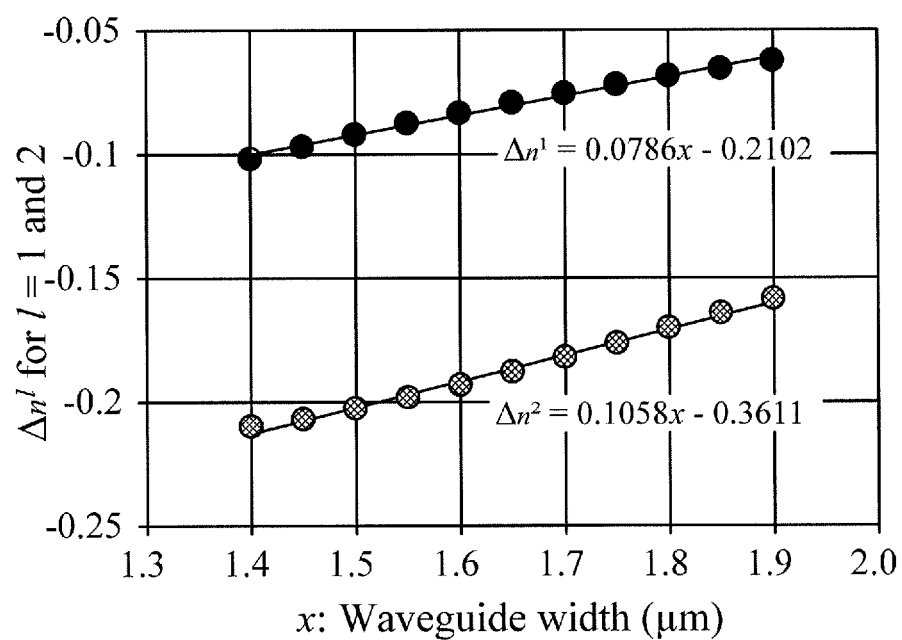
FIG. 4 is a graph showing an example of a difference in an effective refractive index depending on the waveguide width.

FIG. 4 is a graph showing an example of a difference in an effective refractive index depending on the waveguide width. In the graph shown in FIG. 2, the waveguide width at a wavelength of 1.58 μm when a rib waveguide formed by 500 nm SOI has a slab height of 290 nm is shown on the x-axis, while the differences $\Delta n^l$ in an effective refractive index between a primary mode and a fundamental mode and between a secondary mode and the fundamental mode are shown on the y-axis.

Figure 5:
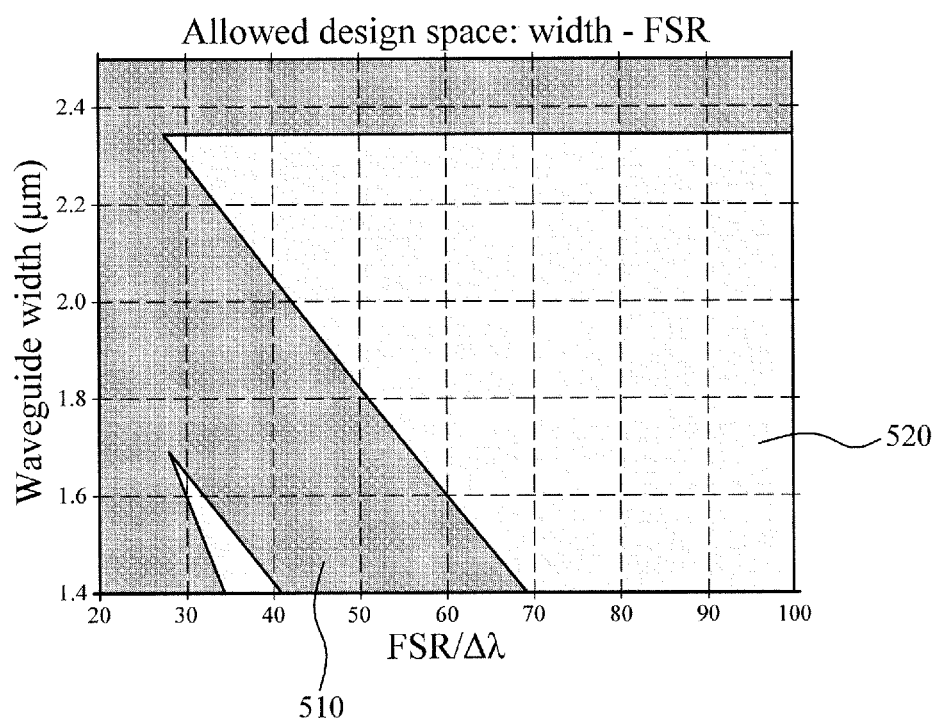
FIG. 5 is a graph showing an allowed region of the primary mode in the design space with the waveguide width and the FSR as variables.
Figure 6:
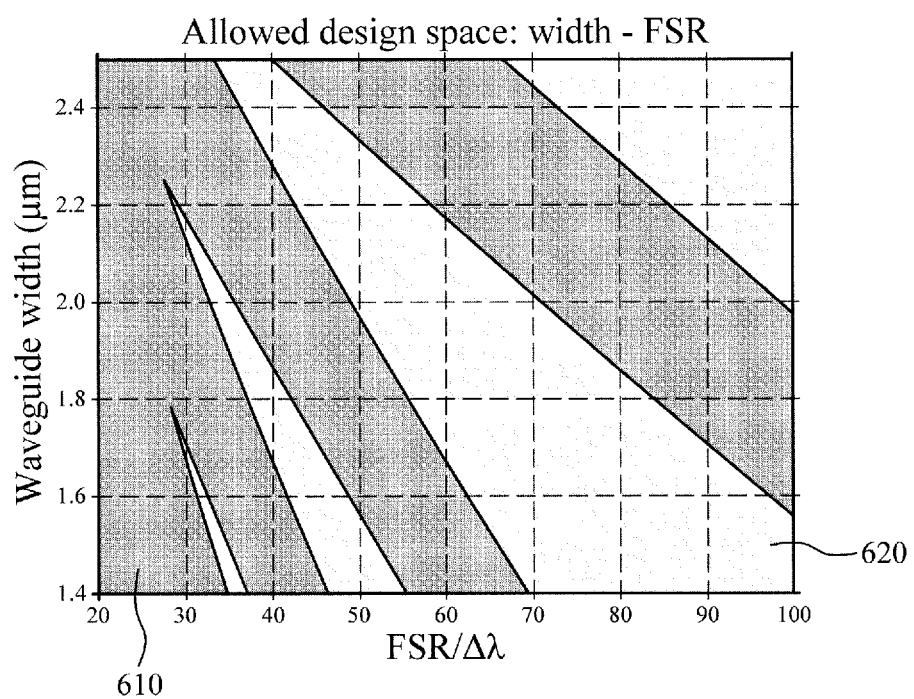
FIG. 6 is a graph showing an example of an allowed region of a secondary mode in the design space with the waveguide width and the FSR as variables.
Figure 7:
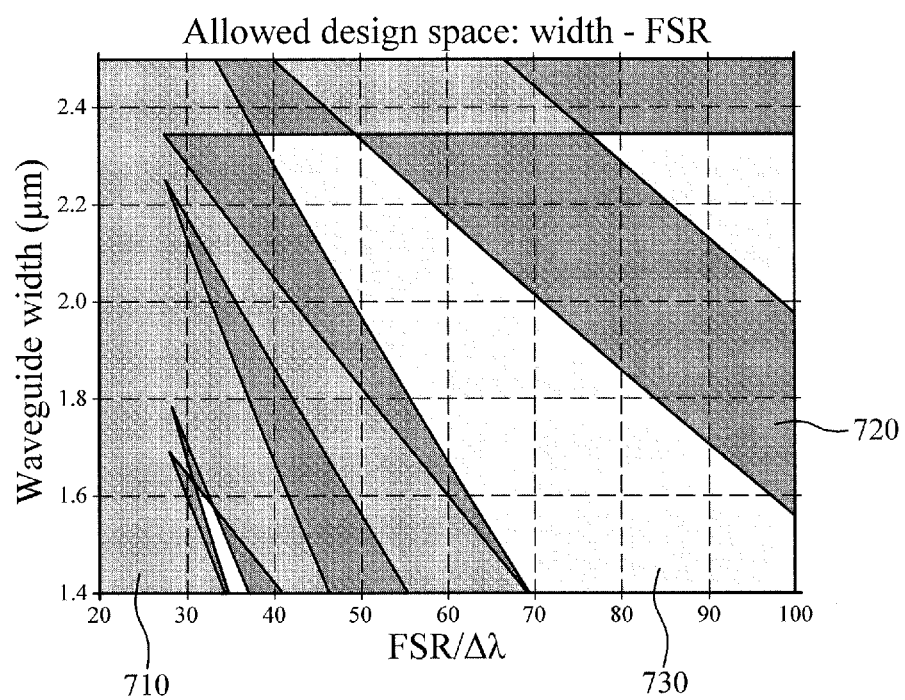
FIG. 7 is a graph showing an example of an allowed region for the primary mode and the secondary mode in the design space with the waveguide width and the FSR as variables.

As described above, by using the difference $\Delta n^l$ in an effective refractive index and Equation 9, the design space with the waveguide width and the FSR as variables may be formed as shown in FIGS. 5 to 7. In such design spaces, an allowable region that satisfies Equation 10 and Equation 11 may be determined. In an actual implementation, there may be a discrepancy between the difference in an effective refractive index and a computer simulation result and hence experimental calibration may be needed.

FIG. 5 is a graph showing an allowed region of the primary mode in the design space with the waveguide width and the FSR as variables.

Referring to FIG. 5, under the assumption that a bandwidth of the ROI is 10 nm, an allowed region is denoted by 510 and a non-allowed region is denoted by 520. For example, in the case where the width of the arrayed waveguides 150 is set to 1.6 µm and the FSR is designed to be five times greater than a channel spacing Δλ, the point indicated by two designed variables falls within the non-allowed region 520 in FIG. 5, and thus, if said designed variables are used, the fundamental mode peak and the peak due to the primary mode cannot be separated from each other. Meanwhile, in the case where the width of the arrayed waveguides is set to 1.6 µm and the FSR is designed to be 60 times greater than a channel spacing Δλ, the point indicated by two designed variables falls within the allowed region, and hence the peak due to the primary mode and the fundamental mode peak can be separated from each other.

FIG. 6 is a graph showing an example of an allowed region of a secondary mode in the design space with the waveguide width and the FSR as variables.

Referring to FIG. 6, an allowed region is denoted by 610 and a non-allowed region is denoted by 620.

FIG. 7 is a graph showing an example of an allowed region for the primary mode and the secondary mode in the design space with the waveguide width and the FSR as variables.

Referring to FIG. 7, an overlap between the allowed regions of the primary mode and the second mode is determined as a desired allowed region. A region where the peak of either of the primary and secondary modes is separated from the fundamental mode peak is demoted by 710 and a region where the peaks of the two modes are all separated from the fundamental mode peak.

Figure 8:
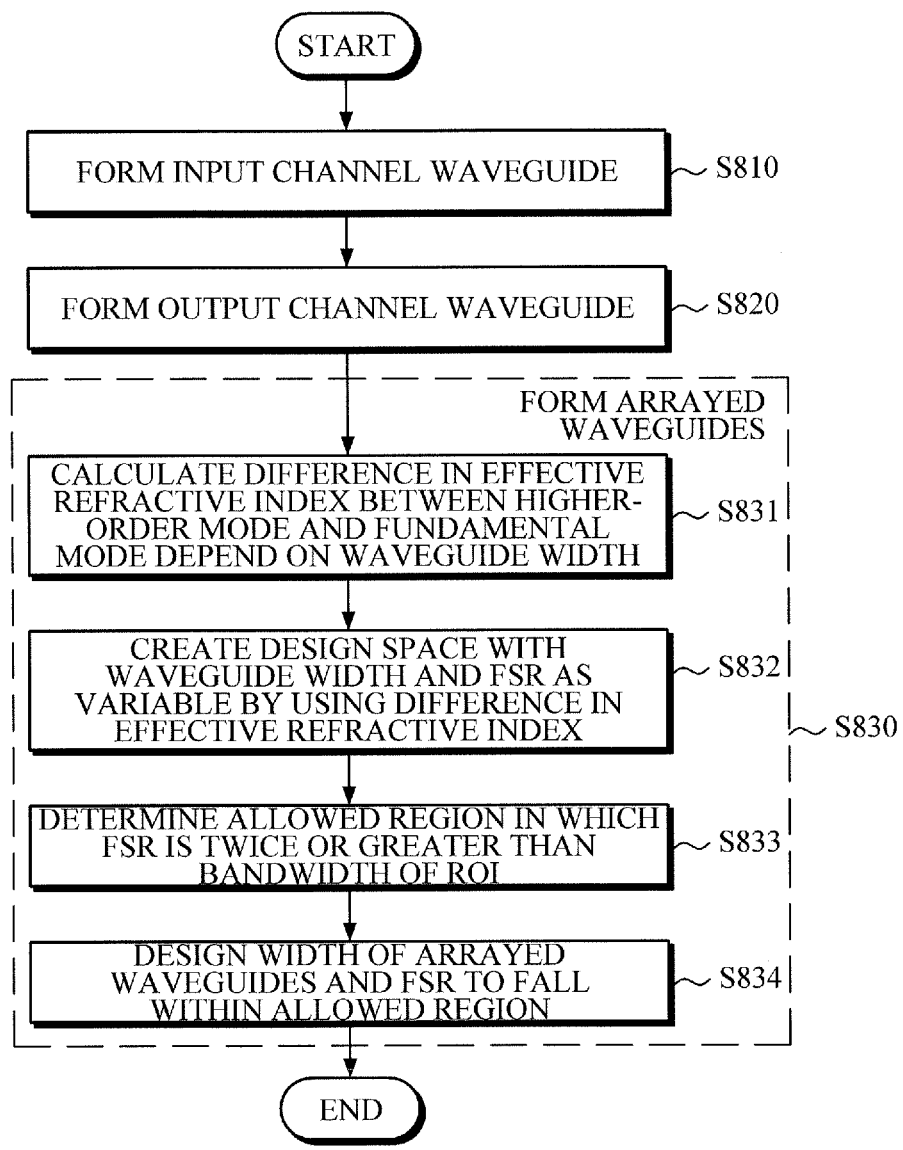
FIG. 8 is a flowchart illustrating a method for manufacturing an arrayed waveguide grating according to an exemplary embodiment.

FIG. 8 is a flowchart illustrating a method for manufacturing an arrayed waveguide grating according to an exemplary embodiment.

Referring to FIG. 8, the method includes forming input channel waveguides on a substrate, as depicted in S810, forming output channel waveguides that correspond to the input waveguides, as depicted in S820, and forming arrayed waveguides with different lengths interposed between the input channel waveguides and the output channel waveguides on the substrate while forming free propagation regions at both ends of the arrayed waveguides, as depicted in S830. At this time, the arrayed waveguides are designed so that an FSR of a higher-order mode is twice or greater than the bandwidth B of a region of interest (ROI). Here, the bandwidth B of the ROI may be designed to include a guard by taking into account sidelobes of a peak.

To this end, the formation of the arrayed waveguide in S830 may include calculating a difference in an effective refractive index between the higher-order mode and the fundamental mode depending on the waveguide width, as depicted in S831, creating a design space with the waveguide width and the FSR as variables by using the difference in an effective refractive index, as depicted in S832, determining an allowed region where the FSR is twice or greater than the bandwidth B of the ROI, as depicted in S833, and designing the waveguide width of the arrayed waveguides and the FSR to fall within the allowed region, as depicted in S834. Here, the design space may have the waveguide width and the FSR as variables. In addition, if there are two or more higher-order modes, an overlap between allowed regions determined for the respective modes may be determined as a desirable allowed region.

According to the exemplary embodiments, the AWG does not experience performance degradation due to a higher-order mode, while allowing the higher-order mode in the arrayed waveguides. In addition, the AWG does not necessarily require a mode filter for suppressing a higher-order mode, thereby reducing the performance degradation. Also, any layout shape is advantageously applicable.

Furthermore, according to the exemplary embodiment, the AWG is easily applied especially to a system with a limited operating range. That is, since the total bandwidth used by a TWDM-PON system or a point-to-point WDM-PON system is not significantly large, it is easy to design the AWG so that the peaks due to higher-order modes are off the operating range.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method for manufacturing an arrayed waveguide grating, comprising:
   forming input channel waveguides on a substrate;
   forming output channel waveguides on the substrate that correspond to the input channel waveguides; and
   forming arrayed waveguides with different lengths interposed between the input channel waveguides and the output channel waveguides on the substrate while forming free propagation regions at both ends of the arrayed waveguides, wherein the arrayed waveguides are designed so that a free spectral range (FSR) of a higher-order mode is twice or greater than a bandwidth of a region of interest (ROI), wherein the forming of the arrayed waveguides includes:
   calculating a difference in an effective refractive index between the higher-order mode and a fundamental mode depending on a waveguide width;
   creating a design space with the waveguide width and an FSR as variables by using the difference in an effective refractive index;
   determining an allowed region where the FSR is twice or greater than the bandwidth of the ROI; and
   designing a waveguide width of the arrayed waveguides and the FSR to fall within the allowed region.

2. The method of claim 1, wherein the bandwidth of the ROI is set to include a guard by taking into consideration a sidelobe of a peak.

3. The method of claim 1, wherein the creating of the design space comprises creating the design space with the waveguide width and the FSR as variables by applying the difference $\Delta n^l$ in an effective refractive index depending on the waveguide width to Equation 13 below:

$$k_0 = m \frac{\Delta n^l}{n_0} \left( \frac{\lambda_0}{\lambda_0^l} \right)^2, \tag{13}$$

where m denotes a diffraction order of an AWG center wavelength, $\Delta n^l$ represents a difference in an effective refractive index between the higher-order mode and the fundamental mode depending on the waveguide width, $n_o$ represents a refractive index of the fundamental mode, $\lambda_o$ represents a center wavelength of the AWG, $\lambda_o^l$ represents a location of peak with diffraction order m due to the lth order mode of a waveguide in a spectrum of the AWG, and $k_o$ represents a value of k when $\lambda_k^l = \lambda_0$.

4. The method of claim 1, wherein the determining of the allowed region comprises, when there are two or more higher-order modes, determining an overlap between allowed regions determined for the respective modes as a desirable allowed region.

5. An arrayed waveguide grating device comprising:
a plurality of input channel waveguides formed on a substrate;
a plurality of output channel waveguides formed on the substrate that correspond to the input channel waveguides; and
a plurality of arrayed waveguides with different lengths interposed between the input channel waveguides and the output channel waveguides on the substrate while free propagation regions being formed at both ends of the arrayed waveguides,
wherein the arrayed waveguides are designed so that a free spectral range (FSR) of a higher-order mode is twice or greater than a bandwidth of a region of interest (ROI),
wherein in a design space with a waveguide width and an FSR as variables that is created by using a difference in an effective refractive index between a higher-order mode and a fundamental mode depending on the waveguide width, the arrayed waveguides are designed so that the waveguide width falls within an allowed region in which the FRS is twice or greater than the bandwidth of the ROI.

6. The arrayed waveguide grating device of claim 5 wherein the bandwidth of the ROI is set to include a guard by taking into consideration a sidelobe of a peak.

7. The arrayed waveguide grating device of claim 5, wherein the design space is created as a design space with the waveguide width and the FSR as variables by applying the difference $\Delta n^l$ in an effective refractive index depending on the waveguide width to Equation 14 below:

$$k_0 = m \frac{\Delta n^l}{n_0} \left(\frac{\lambda_0}{\lambda_0^l}\right)^2, \quad (14)$$

where m denotes a diffraction order of an AWG center wavelength, $\Delta n^l$ represents a difference in an effective refractive index between the higher-order mode and the fundamental mode depending on the waveguide width, $n_o$ represents a refractive index of the fundamental mode, $\lambda_o$ represents a center wavelength of the AWG, $\lambda_o^l$ represents a location of peak with diffraction order m due to the lth order mode of a waveguide in a spectrum of the AWG, and $k_o$ represents a value of k when $\lambda_k^l = \lambda_o$.

8. The arrayed waveguide grating device of claim 5, wherein, when there are two or more higher-order modes, an overlap between allowed regions determined for the respective modes is determined as the allowed region.

9. The arrayed waveguide grating device of claim 5 wherein the arrayed waveguide grating device is for a time and wavelength division multiplexed passive optical network (TWDM-PON).

10. The arrayed waveguide grating device of claim 5 wherein the arrayed waveguide grating device is for a point-to-point wavelength division multiplexed passive optical network (WDM-PON).

11. A method for manufacturing an arrayed waveguide grating, comprising:
forming input channel waveguides on a substrate;
forming output channel waveguides on the substrate that correspond to the input channel waveguides; and
forming arrayed waveguides with different lengths interposed between the input channel waveguides and the output channel waveguides on the substrate while forming free propagation regions at both ends of the arrayed waveguides;
wherein the arrayed waveguides are designed by:
calculating a difference in an effective refractive index between at least one higher-order mode and a fundamental mode of a free spectral range (FSR);
creating a design space by using the waveguide width and the FSR with the waveguide width and the FSR as variables by using the difference in an effective refractive index;
determining an allowed region where the FSR is twice or greater than the bandwidth of the ROI; and
designing a waveguide width of the arrayed waveguides and the FSR to fall within the allowed region.

12. The method of claim 11, wherein calculating a difference in an effective refractive index between at least one higher-order mode and a fundamental mode of a free spectral range (FSR) includes calculating a difference in an effective refractive index between two or more higher-order modes and a fundamental mode to determine an overlap between allowed regions for the respective modes as a desirable allowed region.

13. The method of claim 11, further comprising:
operating the arrayed waveguide grating independent of a mode filter for suppressing higher-order modes while allowing the higher-order modes in the arrayed waveguides.

14. The method of claim 11, wherein the arrayed waveguide grating is for a time and wavelength division multiplexed passive optical network (TWDM-PON).

15. The method of claim 11 wherein the arrayed waveguide grating is for a point-to-point wavelength division multiplexed passive optical network (WDM-PON).

* * * * *